Aug. 23, 1960     B. A. KNAUTH     2,949,764

ADJUSTABLE FLOW NOZZLE FOR A FLOWMETER

Filed Sept. 13, 1956

INVENTOR
BERTHOLD A. KNAUTH

BY *Andros and Smith*

ATTORNEYS

United States Patent Office 2,949,764
Patented Aug. 23, 1960

2,949,764

ADJUSTABLE FLOW NOZZLE FOR A FLOWMETER

Berthold A. Knauth, High Falls, N.Y.

Filed Sept. 13, 1956, Ser. No. 609,750

5 Claims. (Cl. 73—3)

This invention relates to a flow nozzle having an adjustable and variable effective area, and more specifically, to a flow nozzle which may be used to calibrate or to adjust the accuracy of a flowmeter.

Heretofore, flow nozzles have necessarily been designed to accommodate a prescribed rate of flow with predetermined pressure drops therein. This has required very careful and lengthy computation to determine the proper size thereof.

It is an object of the present invention to provide a flow nozzle which selectively can be adjusted when installed in front of a flowmeter, or in other locations with respect thereto, so that the flowmeter properly can be calibrated.

It is a further object of the invention to provide such a device which is economic of manufacture, simple of operation, sturdy and durable of construction, will function with relative freedom from wear and tear and other mechanical difficulties, and which may be readjusted as required by changing conditions.

Other and further objects and advantages will appear from the following specification, taken with the accompanying drawing, in which like characters of reference indicate similar elements in the several views, and in which.

It has been found that it is possible to make an orifice of approximately the correct size without requiring very lengthy computations. However, the use of such an orifice leads to only approximate accuracy of the flowmeter. It has been discovered further by the present inventor that by the provision of auxiliary adjustable flow passages surrounding the orifice, the flowmeter may be calibrated under actual test conditions by adjustment of the auxiliary flow passage.

Figure 1:
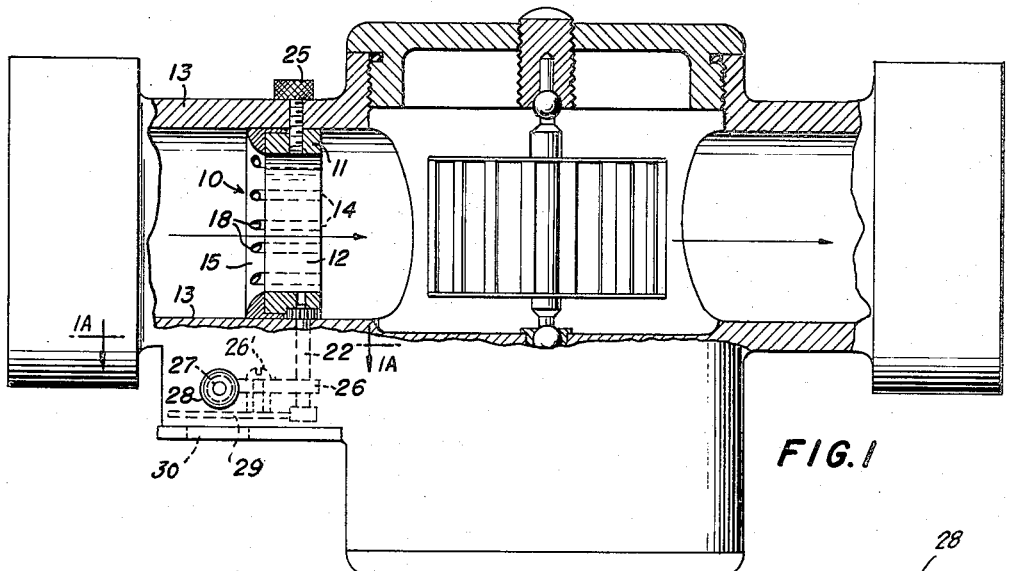
Figure 1 is a plan view, partly in section, showing the adjustable orifice in place in front of a vortex cage of the flowmeter.
Figure 2:
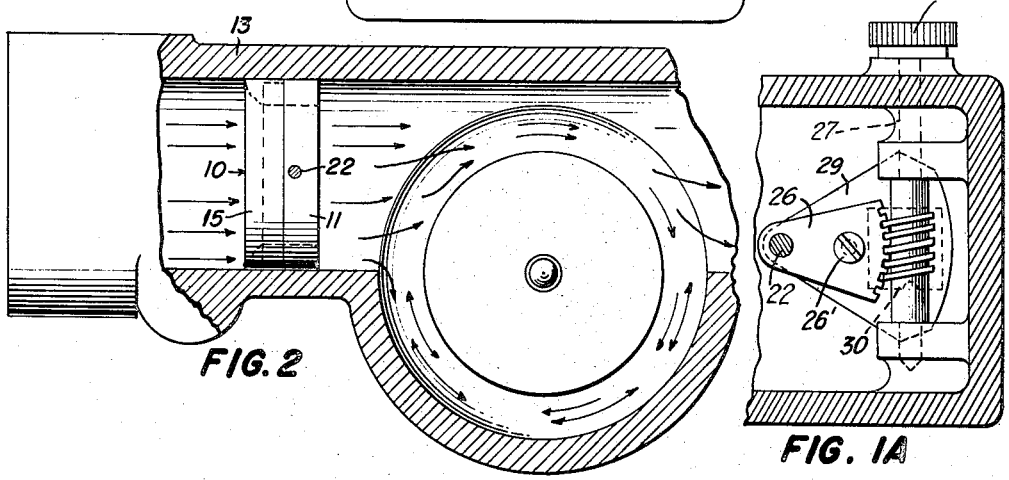
Figure 2 is an elevation view, partly in section, of the device of Figure 1.

As seen in Figure 1, an adjustable orifice device, or plate, indicated generally by reference numeral 10, is placed in the pipe connection leading to a flowmeter of the vortex-velocity type where it is especially useful. Such flowmeters are described in my co-pending applications Serial Nos. 532,187 and 609,708, filed September 2, 1955, now Patent No. 2,906,121 and September 13, 1956, now Patent No. 2,845,798, respectively, the instant application being a continuation-in-part thereof.

Figures 3, 4:
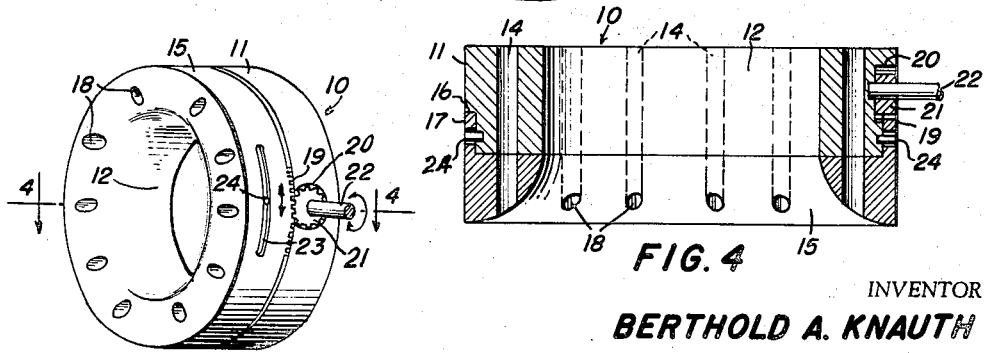
Figure 3 is a perspective view of the adjustable nozzle of the present invention.
Figure 4 is a section taken on the line 4—4 of Figure 3.

The device 10 also is shown by itself in Figures 3 and 4 and is made of a fairly thick disc 11 with an orifice 12 therethrough of the estimated minimum size for such orifice computed for the specific flowmeter with which it is to be used.

Spaced at equal distances about the disc between the orifice 12 and the wall 13 of the passage in which the orifice is located, are a plurality of auxiliary flow passages 14.

On the leading edge, or upstream side, of disc 11 is a second orificed disc 15 with a central aperture of the same size as orifice 12, and the leading edge of which is appropriately shaped to give the desired streamlining.

The disc 11 is formed with an annular rabbet 16 about its periphery and disc 15 is provided with an annular peripheral rib 17 which engages in the rabbet 16 of disc 11 so that the disc 15 may be rotated with respect to disc 11.

A plurality of auxiliary flow passages 18 are located in disc 15 corresponding to auxiliary flow passages 14 in disc 11 so that when flow passages 18 are in alignment with passages 14 a maximum area of flow passages is presented. When disc 15 is rotated from that position the auxiliary flow passages may be entirely closed.

In order to provide for adjustment of disc 15 with respect to disc 11 a portion of annular rib 17 is formed with gear teeth 19. A recess 20 is provided in the periphery of disc 11 into which a spur gear 21 fits which may be rotated by a shaft 22 secured thereto and extending through wall 13 of the passage in which the orifice is located.

In order to avoid the hazard of maladjustment of the auxiliary flow passages and to avoid separation of discs 11 and 15 after assembly, a slot 23 is provided in annular peripheral rib 17 and a pin 24 secured to the side wall of rabbet 16 engages slot 23.

Figure 1A:
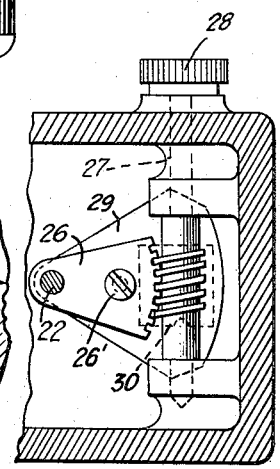
Figure 1A is a fragmentary sectional view taken on line 1A—1A of Figure 1.

As seen in Figure 1, adjustable orifice 10 may be mounted in the passage bounded by wall 13 by means of locking screw 25 or other convenient securing means. Shaft 22 as seen in Figure 1 extends into a housing outside of wall 13 and may be rotated by a quadrant 26 actuated by a worm gear 27 to which a finger piece 28 is attached and by which the operator may adjust the auxiliary flow passages 14, 18. A pointer 29 may be mounted on shaft 22 to indicate the setting of the orifice. Pointer 29 is secured to quadrant 26 by screw and spacer 26' as seen in Figures 1 and 1A and may be viewed through window 30. Pointer 29 may be a needle like device similar to a clock hand moving past a fixed scale or may be a movable scale mounted on a plate, readable through the window 30.

It will be seen that a simple and sturdy adjustable flow nozzle has been provided by which a flowmeter may be accurately calibrated.

It is evident that under certain conditions it would be desirable to form the adjustable orifice 10 with the fixed disc 11 on the upstream side in which case the streamlining would be placed on disc 11 instead of on disc 15.

Although a specific embodiment of the invention has been described above, it will be understood that such changes and modifications in design, structure and detail may be made within the scope of the appended claims without departing from the spirit of the invention.

Having described my invention, what I claim as new and desire to secure by Letters Patent is:

1. In a vortex velocity flowmeter an adjustable flow nozzle, through which fluid to be metered is delivered to said flowmeter, comprising a fixed disc, a rotatable disc, a concentric primary aperture through both said discs to provide a constant main flow passage, and a plurality of longitudinally arranged auxiliary apertures through said two discs at spaced intervals about said concentric apertures and separated therefrom to provide independent secondary flow passages, and means to rotate said rotatable disc to adjust the alignment of said auxiliary apertures, whereby the flowmeter may be calibrated.

2. In a vortex velocity flowmeter an adjustable calibrating flow nozzle mounted at the upstream end of said flowmeter, said nozzle comprising a fixed disc portion, a primary flow aperture through said fixed portion, a plurality of auxiliary flow apertures through said fixed portion arranged in a pattern concentric with said primary flow aperture in said fixed portion, a rotatable portion having a central primary flow aperture matching the primary aperture in said fixed portion and mounted concentrically with the primary flow aperture, said rotatable portion being provided with longitudinally arranged auxiliary flow apertures so positioned that in one position of said rotatable portion with said fixed portion said auxiliary flow apertures in the fixed portion and in the rotary portion are in alignment, and in another position said auxiliary flow apertures in the fixed and rotary portions are out of alignment, said primary flow apertures providing a constant main flow passage, and said auxiliary flow apertures being separated from said primary apertures and providing independent secondary flow passages.

3. The device of claim 1 in which said rotatable disc is provided with a concentric flange having a row of teeth along a portion thereof, and in which a spur gear is mounted in said fixed disc meshing with the teeth on said concentric flange whereby, upon rotation of said spur gear, said rotatable disc will be rotated to adjust the alignment of said auxiliary apertures.

4. The device of claim 3 in which said spur gear may be rotated by means of a shaft extending radially from said nozzle assemblage and provided with worm and quadrant means whereby the shaft may be accurately rotated through very small angles, and provided with a pointer for visual determination of the condition of adjustment of the nozzle.

5. In combination with a vortex velocity flowmeter, a flow passage through which fluid to be metered is delivered to said meter, a flow nozzle in said flow passage said flow nozzle comprising a central flow aperture of a size approximating the aperture size required to provide a constant main flow passage, a plurality of auxiliary flow apertures longitudinally disposed around said central aperture and separated therefrom to provide independent secondary flow passages, and means for adjusting the areas of opening of said auxiliary apertures, whereby the effective size of said flow nozzle may be adjusted to bring the reading of the vortex velocity flowmeter into agreement with the volume of flow actually passing through said meter.

References Cited in the file of this patent
UNITED STATES PATENTS

| | | |
|---|---|---|
| 864,579 | Volz | Aug. 27, 1907 |
| 2,018,403 | Hussar | Oct. 22, 1935 |
| 2,612,747 | Skinner | Oct. 7, 1952 |
| 2,773,384 | Gehre | Dec. 11, 1956 |